United States Patent
Deuber et al.

(10) Patent No.: US 9,957,102 B2
(45) Date of Patent: May 1, 2018

(54) PORTION CAPSULE FOR PREPARING A BREWED PRODUCT AND A METHOD FOR PRODUCING SAID PORTION CAPSULE

(71) Applicant: QBO Coffee GmbH, Wallisellen (CH)

(72) Inventors: Louis Deuber, Richterswil (CH);
Rüdiger Ternité, Hamburg (DE);
Robert Stein, Weddelbrook (DE);
Roland Rupfle, Hörbranz (AT)

(73) Assignee: QBO COFFEE GMBH, Wallisellen (CH)

( * ) Notice: Subject to any disclaimer, the term of this patent is extended or adjusted under 35 U.S.C. 154(b) by 15 days.

(21) Appl. No.: 15/104,441

(22) PCT Filed: Dec. 11, 2014

(86) PCT No.: PCT/EP2014/077351
§ 371 (c)(1),
(2) Date: Jun. 14, 2016

(87) PCT Pub. No.: WO2015/096990
PCT Pub. Date: Jul. 2, 2015

(65) Prior Publication Data
US 2016/0325862 A1    Nov. 10, 2016

(30) Foreign Application Priority Data
Dec. 24, 2013  (EP) ..................................... 13199515

(51) Int. Cl.
*B65D 85/804* (2006.01)
*B65B 29/02* (2006.01)
(Continued)

(52) U.S. Cl.
CPC ........ *B65D 85/8043* (2013.01); *B65B 7/2878* (2013.01); *B65B 29/02* (2013.01); *B65B 51/225* (2013.01)

(58) Field of Classification Search
CPC ................................................... B65D 85/8043
See application file for complete search history.

(56) References Cited

U.S. PATENT DOCUMENTS

| 2009/0007793 A1 | 1/2009 | Glucksman et al. |
| 2012/0015080 A1* | 1/2012 | Roulin ............... B65D 85/8043 426/110 |
| 2012/0090475 A1* | 4/2012 | Deuber ................... B65B 29/02 99/295 |

FOREIGN PATENT DOCUMENTS

| EP | 2 465 793 | 6/2012 |
| WO | 2010/118543 | 10/2010 |

* cited by examiner

*Primary Examiner* — Erik Kashnikow
*Assistant Examiner* — Chaim Smith
(74) *Attorney, Agent, or Firm* — Rankin, Hill & Clark LLP

(57) ABSTRACT

A method for producing a capsule includes providing a plastic main body having a bottom region, a peripheral side wall, and a peripheral main-body collar adjoining the peripheral side wall, wherein the main body has a substantially rectangular cross-section in the region of the main-body collar; providing a deep-drawn plastic cover for closing the capsule, wherein the cover forms an outward curvature, which adjoins a peripheral cover collar; filling the main body with an extraction material; and placing the cover onto the main body such that the cover collar lies on the main-body collar and fastening the cover collar to the main-body collar via ultrasonic welding. The cover is provided with an energy-director, which focuses the ultrasound energy during the ultrasonic welding, and wherein the cover has at least one groove that extends peripherally on an outer face in the region of the cover collar.

12 Claims, 3 Drawing Sheets

(51) Int. Cl.
*B65B 7/28* (2006.01)
*B65B 51/22* (2006.01)

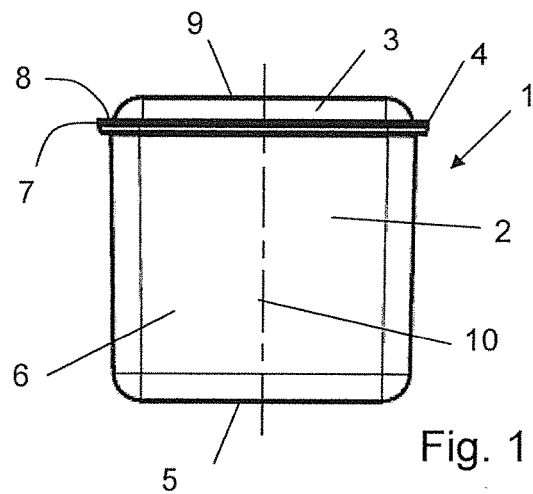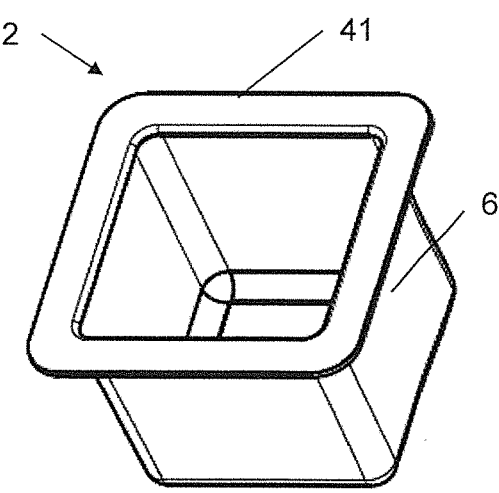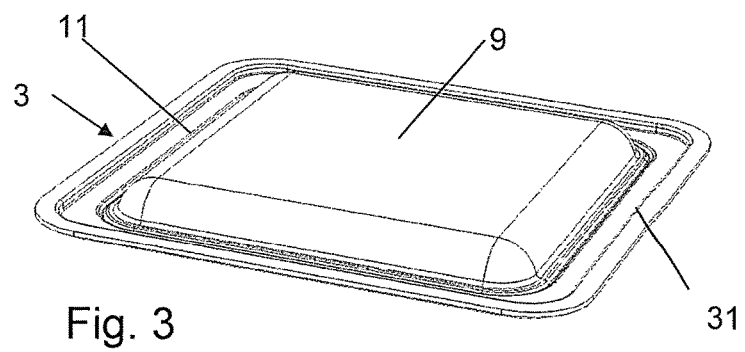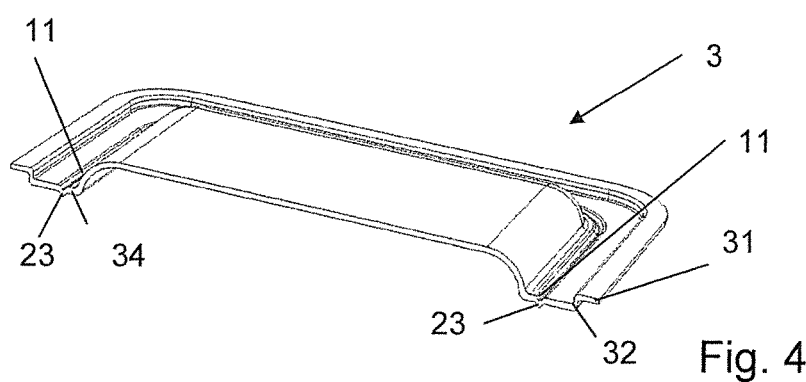

PORTION CAPSULE FOR PREPARING A BREWED PRODUCT AND A METHOD FOR PRODUCING SAID PORTION CAPSULE

BACKGROUND OF THE INVENTION

Field of the Invention

The invention relates to the preparation of drinks or likewise, from an extraction material, for example ground coffee, which is contained in a capsule. In particular, it relates to a method for manufacturing a capsule filled with an extraction material, as well as to a capsule manufactured with this method.

Description of Related Art

Extraction apparatus for preparing drinks from an extraction material present in a portion package are known, for example as coffee machines, espresso machines or also tea machines and are enjoying increasing popularity as was hitherto the case. In many corresponding systems, the portion packages are designed as capsules, in which the extraction material is closed off, for example in an airtight manner. The capsule is pierced at two opposite sides, for the extraction. A brewing fluid—generally hot water—is introduced at the first side. The brewed product is led out of the capsule at the second side. Thereby, a considerable pressure for example of 5-20 bar must prevail in the inside of the capsule—also less for filter coffee or tea—depending on the drink to be prepared and the system.

In particular, aluminium and plastics, for example polypropylene have become known as capsule materials. Aluminium capsules provide a very good durability (aroma protection) of the extraction material, but are very energy-costly in manufacture. Polypropylene capsules are advantageous with regard to the energy expense and disposal, but impose increased demands on the piercing mechanism and the aroma protection.

A coffee portion capsule that approximately has a cube shape and in contrast to the known beaker-like capsules has no peripheral collar on the plane of the one (upper-side) cover surface is known from WO 2010/118543. Such a peripheral collar is required with capsule systems according to the state of the art, amongst other things for the closure of the capsule by a flat cover (which is typically designed as a membrane or foil). The collar is required in order to accommodate an energy director, with a closure by way of ultrasound welding. If the capsule is closed by way of thermal sealing, the collar is necessary, so that the cover lies on a sufficiently large surface. In contrast to this, an arched cover is used according to WO 2010/118543, and the closure is effected for example by way of ultrasound cut'n' seal. The capsule manufactured according to the teaching of WO 2010/118543 accordingly, independently of its ("cube") shape, has a welding bead, which is peripheral between the planes defined by the cover surface, forms only a minimal collar and whose extension/lateral projection is significantly reduced in comparison to the collar of known capsules.

The capsule according to WO 2010/118543 has significant advantages, which are also described in this document. However, it remains a challenge to reliably fasten the cover on the main body whilst taking into consideration to limitations in the dimensioning of the peripheral welding bead. Moreover, there is also the challenge of positioning the energy director on the peripheral collar, which is significantly restricted in its dimensioning after manufacture, in particular if the capsule is to be manufactured by deep-drawing, in the case of a closure by way of ultrasound welding.

SUMMARY OF THE INVENTION

Accordingly, it is an object of the present invention, to further develop a method for manufacturing capsules of the type described in WO 2010/118543, to the extent that a simple manufacturability and a reliable and particularly pressure-resistant closure of the capsule is rendered possible.

According to an aspect of the invention, a method for manufacturing a capsule comprises the following steps:

providing a plastic main body, with a bottom region, with a peripheral side wall and with a peripheral main-body collar connecting to the peripheral side wall, wherein the main body has an essentially rectangular cross section in the region of the collar;

providing a plastic cover (from the same plastic as that of which the main body consists, or of a plastic of a different composition but which can be welded to the main body plastic) for closure of the capsule, i.e. for forming a closed capsule together with the main body, wherein the cover, connecting to a peripheral cover collar, forms an outward arching, wherein the peripheral cover collar in its dimensioning is matched to the main-body collar;

filling the main body with an extraction material; and placing the cover onto the main body, such that the cover collar lies on the main-body collar, and fastening the cover collar on the main-body collar by way of ultrasound welding.

According to the method, the cover is provided with an energy director, which focuses the ultrasound energy during the ultrasound welding, the cover is manufactured by deep-drawing and the cover includes at least one groove, which is peripheral on an outer side, in the region of the cover collar.

A capsule, which is filled with an extraction material and can be manufactured with such a method, includes:

a main body of a plastic, with a bottom region and with a peripheral side wall; and a cover of a plastic, which is fastened on the main body;

wherein the cover is fastened on the main body along a peripheral collar, wherein the collar is manufactured by way of ultrasound welding of a main-body collar connecting onto the peripheral side wall towards the cover side, and of a cover-collar;

wherein the main body in the region of the collar has an essentially rectangular cross section;

wherein the cover forms an outward arching, so that the cover contributes to a capsule volume;

wherein an energy director is integrated into the cover collar, wherein the cover is manufactured by deep-drawing, and wherein the cover comprises at least one groove which is peripheral on an outer side, in the region of the cover collar.

Energy directors for ultrasound welding methods for the closure of portion capsules have been known for some time now and are also described, for example, in WO 2010/118543. However, that document teaches the attachment of the energy director on the collar of the main body. This was the generally common technology for ultrasound-welded portion capsules at the point in time of the application, with the prevailing belief that it was neither possible, nor advantageous to integrate an energy director into the cover instead. The present invention now for the first time suggests the provision of such an energy director on the cover—which is always arranged at the top during the ultrasound welding due to the filling of the main body—and not on the main body.

This amongst other things entails the following advantages.

Firstly, it has been found that an energy director is simpler to manufacture on the cover. Specifically, it has been ascertained that it is relatively challenging to place an energy director on a narrow collar, close to the peripheral side wall, for deep-drawing a main body—not least with a shape that is rectangular in cross section.

The present invention, with the suggested procedure contributes to keeping the edge narrower and thus, for example, improving the stacking ability and compactness of the completed capsules.

Secondly, it has been found that the ultrasound welding functions better if the energy director lies on the side of the sonotrode, at least with capsules of the type described here. However, it is not possible to permit the sonotrode to engage from below, thus from the main body, due to the filling of this main body. The present invention remedies this by way of the provision of the energy director on the cover.

The shape of the capsule is such, that the main body in the region of the collar is essentially rectangular, for example essentially square, in cross section. The collar itself—for example its outer edge—can also be essentially rectangular, in particular square. "Essentially rectangular" or "essentially square" in particular does not exclude rounded corners.

The capsule as a whole—with the exception of the collar and a possible offset of the cover arching, see below—can have the shape of a cube or cuboid, in particular of a cube. In embodiments, the collar can laterally project at least 0.8 mm, in particular at least 1 mm and/or maximally 2 mm, in particular maximally 1.5 mm. An advantage of this dimensioning (width between 0.8 mm and 2 mm) is the fact that here one obtains the best compromise between stackability/compactness (small overpack) and a reliable sealing. Moreover, the narrow edge helps on guiding into a brewing unit and holding it in the correct orientation, without thereby having to accept the disadvantages of the known large collars (outer volume and corresponding space requirement in packaging and brewing unit; appearance). This is the case independently of the dimensions of the capsule as a whole, i.e. the dimensioning of the collar in embodiments for smaller capsules is selected just as in the mentioned region as for larger capsules.

The cube shape does not rule out an inclination of the peripheral side surfaces to the axis (perpendicular to the bottom surface and/or cover surface) of for example maximal 3°, in particular maximal 2° or maximal 1.5°, which, for example, is inherent of manufacture with deep-drawn capsules.

With an embodiment essentially with a cube shape, the outer length of the cube edges for example is between 24 and 30 mm for a filling quantity of approx. 6 g and approx. 10 g of coffee. Larger dimensions, for example of up to 35 mm, are not to be ruled out for larger filling quantities.

The main body includes a bottom region and a peripheral side wall and thus forms a type of beaker that is closed by the cover. Thereby, the bottom region can be flat, but this is not a necessity.

The shape of the cover, from the outside to the inside, can include the cover collar, an arcuate transition region and a middle flat region forming the actual upper-side cover surface. Such a flat region is set away, which is to say shouldered outwards, from the plane of the cover collar, on account of the transition region which effects the arching. The transition region, for example, can be curved in an S-shaped manner or run in a constantly curved manner from an outer portion at an angle to the collar plane, towards the middle flat region. The dimensioning is thereby selected such that the middle flat region is optically dominant, for example by way of it being as equally large as or only insignificantly (for example by maximal 10%) smaller than the bottom surface. It is particularly with an embodiment of the capsule, which as a whole is cuboid or cube-shaped, that one can envisage this flat region assuming more than 60% of the diameter and accordingly at least 40% of the surface.

The cover collar generally forms a peripheral surface that faces the cover side and extends from an outer edge of the collar up to a base of the arching. In embodiments, one can envisage the base of the arching being offset inwards with respect to the portion of the side wall, onto which the collar connects. Such an offset can, for example, be at least 0.2 mm.

The main body as well as the cover are manufactured of plastic. In particular, one can envisage the main body and the cover consisting of the same plastic. Polypropylene is mentioned as an example of a material, wherein a barrier layer can be incorporated and this has barrier characteristics for oxygen and prevents a diffusion of oxygen into the capsule. Such a barrier layer, for example, includes an ethylene vinylalcohol copolymer (EVOH). The wall thickness in the region of the main body in particular is between 0.1 mm to 0.7 mm, preferably between 0.2 mm and 0.4 mm, for example between 0.25 mm and 0.35 mm. The same can also apply to the wall thickness of the cover. In an embodiment, the wall thickness of the cover roughly corresponds to the wall thickness of the main body.

Other plastics are also considered instead of polypropylene. The application of the invention to ultrasound-weldable non-plastics is also not to be ruled out.

The energy director can have the shape of a rib, as is known per se, for example with a V-shaped profile. Such a rib can be arranged peripherally, parallel to the course of the collar. Two or more such ribs could also be present, and a course that is not parallel to the collar, for one or more ribs, is likewise not ruled out. Other energy director shapes are also conceivable, for example in the form of a peripheral arrangement of individual, hill-like prominences, etc.

The cover in the region of the cover collar on the outer side, i.e. the side that is away from the main body, includes the peripheral groove which, under certain circumstances, forms a structure that is inverse to the energy director and is still visible on the finished manufactured capsule. Such a structure arises on manufacture of the cover with the deep-drawing method (the deep drawing method on the cover can also be considered as an embossing method due to the limited depth of this cover), due to the embossing of the energy director, and can also serve as a centring aid when welding the capsule. Thus, e.g., a peripheral rib, which is complementary to the groove, can also be provided on the sonotrode, with the help of which rib the cover can then be centred on the capsule.

The main body can also be manufactured with the deep-drawing method or alternatively by way of injection moulding. Generally, either the main body and the cover are both deep-drawn or injection moulded in each case, however combinations with an injection moulded main body and a deep-drawn cover and vice versa are also possible.

The main-body collar and/or the cover collar can be provided with an oversize. The protruding regions can then be separated away, for example by way of ultrasound or by punching, subsequently to the welding or simultaneously with the welding.

In embodiments, the cover or the main body, in particular however the cover can be provided with a positioning aid. Such a positioning aid in particular can include a projection, which projects beyond the plane, in which the main-body collar and the cover collar abut one another. According to a first embodiment, a positioning aid is formed by a shoulder in a region of the cover collar or of the main-body collar, wherein the region with the shoulder is subsequently separated away. Such a shoulder can cooperate with the main-body collar or the cover collar, in order to align the cover relative to the main body when the cover is placed. Such a shoulder in particular is favourable with the manufacture by way of deep-drawing, since it can be easily manufactured. According to a second embodiment, a positioning aid can include an inwardly projecting positioning projection that is arranged in the inside of the capsule volume and likewise aligns the cover relative to the main body.

Such a positioning aid in embodiments not only serves for aligning the cover relative to the main body, but also for the improved stacking ability of a multitude of covers after their manufacture.

BRIEF DESCRIPTION OF THE DRAWINGS

Embodiment examples of the invention are hereinafter described by way of drawings. In the drawings, the same reference numerals indicate the same or analogous elements. The drawings are not true to scale and may show elements which correspond to one another in sizes which differ from figure to figure. There are shown in:

FIG. 1 a capsule;

FIG. 2 a main body for the manufacture of a capsule according to FIG. 1;

FIG. 3 a cover for the manufacture of the capsule;

FIG. 4 the cover according to FIG. 3, represented in a truncated manner;

DETAILED DESCRIPTION OF THE INVENTION

Figure 5:
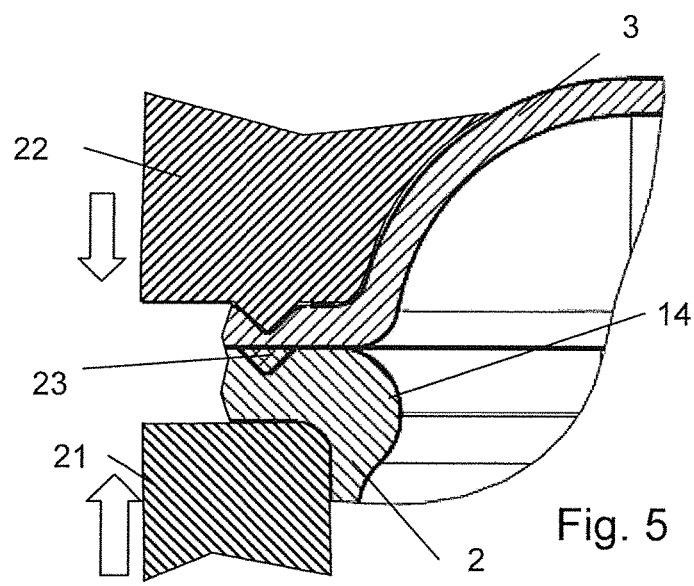
FIGS. 5 and 6 in each case, a sectioned representation of a detail of the capsule according to FIG. 4, in the region of the collar.

The capsule 1 according to FIG. 1 essentially has the shape of a cube with rounded edges. The expanse however increases slightly towards to side lying at the top, so that the capsule has a truncated pyramid shape in a strict mathematical sense. The inclination angle of the surfaces which are lateral in the figure, with respect to the perpendicular to the bottom surface 5—what is meant of course is that plane, which is perpendicular to the bottom surface and which runs through the edge between the bottom surface and the corresponding lateral surface—is very small and at the most is preferably 2°, for example only approx. 1°. Moreover, the height of the capsule above the bottom surface corresponds approximately to the length of the bottom surface edges.

The capsule has a main body (or beaker) 2 and a cover 3 that is fastened thereon along a peripheral collar 4. The main body forms a capsule bottom 5 and a peripheral side wall 6 which, at its end which is at the outside with respect to the axial directions (axis 10) and which is at the top in the figure, is terminated by the collar 4. The cover is arched outwards, by way of the cover surface 9, which is essentially parallel to the capsule bottom 5 being offset outwards with respect to the peripheral collar 4.

FIG. 2 shows the main body 2 (beaker) before the filling and before the closure. The main-body collar 41 has an expanse or dimension that is larger than that of the collar 4 of the finished capsule.

On capsule manufacture, the main body 2 is firstly filled with the extraction material, and the cover 3 is subsequently positioned. FIGS. 3 and 4 show an embodiment example of a cover 3, which is manufactured by way of deep-drawing. The energy director 23, which is formed out in the region of the cover collar 34, has the shape of a peripheral rib that is roughly V-shaped in cross section. Accordingly, a peripheral groove 11 forms on the rear side (on the outer side after capsule manufacture).

The cover has a lateral overhang 31, which is separated away on or after fastening on the main body. A shouldered region is present on the overhang, so that a shoulder 32 is formed. The cover is dimensioned such that the main-body collar 41 reaches up to this shoulder when the cover is positioned on the main body, so that the shoulder serves as an aid on positioning relative to the main body.

Figure 6:
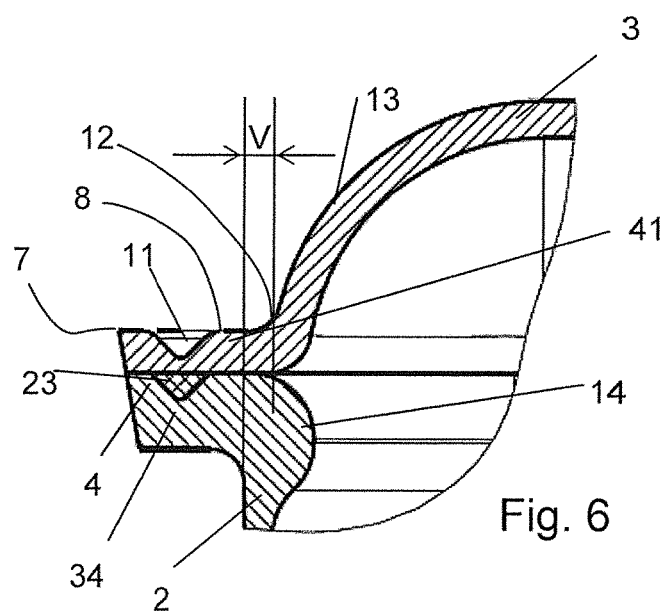

As is represented very schematically in FIG. 5, the main-body collar is supported from below by a first tool 21 (anvil) on closure of the capsule, whilst the cover is placed, and a second tool 22 (sonotrode) couples ultrasound energy from above into the cover collar, so that a welding takes place. FIG. 6 illustrates the location of the welding after separating away the possible overhang. The region, which is represented by way of cross-hatching, illustrates the original position of the energy director 23. In reality the main-body collar and the cover collar are also welded to one another next to this region, after the closure.

The peripheral collar forms a surface 8 that faces the cover side and extends from the outer edge 7 of the collar up to the base 12 of the curvature. As one can see in FIG. 6, the base 12 is set inwards with respect to the peripheral side wall formed by the main body 2. Such an offset v can be of relevance compared to the thickness of the capsule wall, and in particular it is at least 0.2 mm. The offset v, as is illustrated in FIG. 6, is measured between the planes that are parallel to the outer surface of the main body in the region of the collar 4 and go through the location of maximal concave curvature, in the transition between the cover-side surface 8 and the arching of the cover, and between the main-body-side surface 18 of the collar 4 and the outer surface of the main body.

The cover 3 between the collar region and the actual cover surface 9 forms a transition region 13, in which the wall has a curvature and thus forms the arching. In the shown example, this, departing from a portion which is almost at a right angle to the collar plane and the cover surface 9, merges with a continuous convex curvature into the flat region forming the cover surface. The concave curvature is therefore large (i.e., the radius of curvature is small) at the base 12. However, it would also be conceivable to assimilate the concave and the convex curvature to one another, by which means a course, which is S-shaped in cross section, would then result. It is ensured that the middle flat region makes up a large part of the cover surface (at least 40%) and therefore that the cube or cuboid shape as a whole is not compromised, by way of the surfaced limitation of the transition region.

An optional thickening 14 is likewise visible in the transition between the peripheral side wall and the collar, in FIG. 6. Such a thickening serves for additional stiffening.

Figure 7:
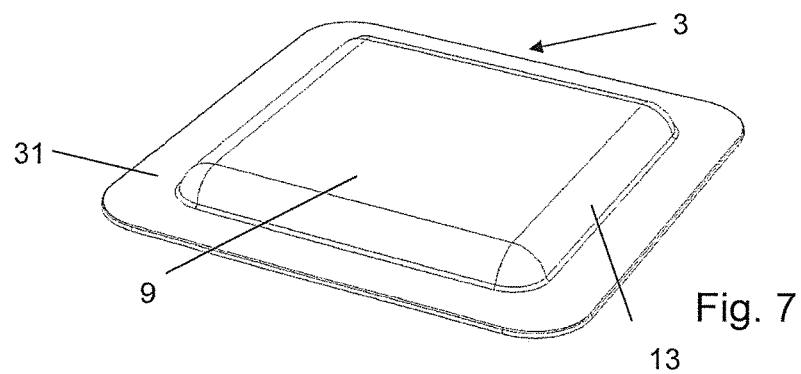
FIG. 7 a further cover.
Figure 8:
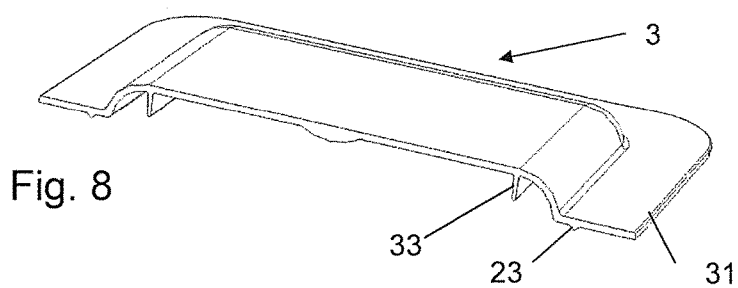
FIG. 8 the cover according to FIG. 7, represented in a truncated manner.
Figure 9:
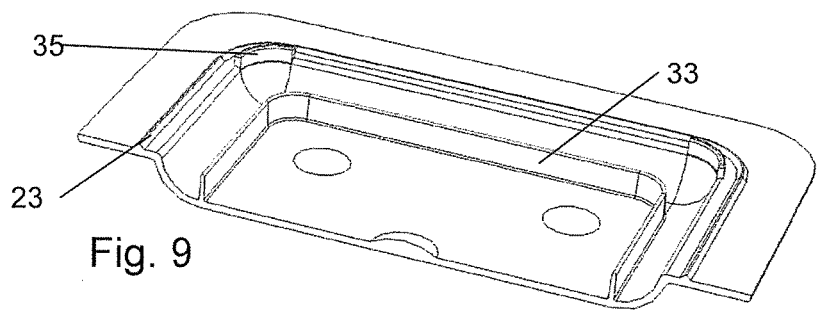
FIG. 9 a bottom view of the cover according to FIG. 7, likewise represented in a truncated manner.

FIGS. 7-9 show a cover 3, which is not manufactured by deep drawing, but by injection moulding, for the improved understanding. A web 33 inwardly projecting on the inner side is integrally formed, additionally to the energy director 23. This web serves for the mechanical stiffening and as a stacking aid. Positioning projections 35 integrally formed in the region of the corners act as a positioning aid. A capsule manufactured by way of deep-drawing can also include an integrally formed positioning aid.

The invention claimed is:

1. A method for manufacturing a portion capsule, which is filled with an extraction material and which is for creating a brewed product, comprising the steps of:
providing a main body of a plastic, with a bottom region, a peripheral side wall, and a peripheral main-body collar connecting to the peripheral side wall, wherein the main body has a rectangular cross section in a region of the main-body collar;
providing a cover of a plastic, wherein the cover, connecting to a peripheral cover collar, forms an outward arching, and wherein dimensions of the peripheral cover collar are matched to the main-body collar, said cover being manufactured by deep drawing and said cover collar having at least one groove that is peripheral and formed in an outer side of the cover collar, said cover comprising an energy director that focuses ultrasound energy during ultrasound welding;
filling the main body with an extraction material; and
placing the cover onto the main body, such that the cover collar lies on the main-body collar, and fastening the cover collar on the main-body collar by way of ultrasound welding.

2. The method according to claim 1, wherein the cover and the main body are manufactured of a same plastic.

3. The method according to claim 1, wherein the energy director is shaped as a peripheral rib.

4. The method according to claim 1, wherein at least the cover is manufactured with an oversize, and protruding regions are separated away subsequent to the welding or simultaneously with welding.

5. The method according to claim 1, wherein the cover is provided with a positioning aid, by way of which the cover is aligned relative to the main body upon placement thereon.

6. A portion capsule of a plastic and which is filled with an extraction material and is for creating a brewed product, said capsule being manufactured with a method according to claim 1, comprising:
a main body with a bottom region and with a peripheral side wall and with a peripheral main-body collar that connects to the peripheral side wall, wherein the main body in a region of the main-body collar has a rectangular cross section;
a cover of a plastic that is fastened on the main body along a peripheral collar,
wherein the collar is manufactured by ultrasound welding of the main-body collar to a cover collar;
wherein the cover forms an outward arching, so that the cover contributes to a capsule volume, wherein
the cover is manufactured by deep-drawing, the cover collar defines at least one groove, which is peripheral on an outer side of the cover collar and an energy director is integrated into the cover collar.

7. The capsule according to claim 6, which, with the exception of the collar is cube-shaped or cuboid.

8. The capsule according to claim 6, wherein a base of the arching is offset inwards in comparison to a portion of the side wall onto which the cover collar connects.

9. The capsule according to claim 6, wherein the cover, from an outside to an inside, comprises a collar region, an arcuate transition region and a flat region, said collar region forming a surface facing towards a cover side, and said flat region being set away from a plane of the surface.

10. The capsule according to claim 9, wherein the flat region assumes at least 40% of a cover surface.

11. The capsule according to claim 6, wherein the collar projects laterally between 0.8 mm and 2 mm.

12. The capsule according to claim 6, wherein the main body and the cover are manufactured from a same plastic.

* * * * *